United States Patent
Graves et al.

(10) Patent No.: US 10,317,787 B2
(45) Date of Patent: *Jun. 11, 2019

(54) MULTILAYERED SCREENS FOR SCANNING BEAM DISPLAY SYSTEMS

(71) Applicant: Prysm, Inc., San Jose, CA (US)

(72) Inventors: Robert L. Graves, Methuen, MA (US); Michael P. McMahon, Holden, MA (US); Philip J. Ralli, Sudbury, MA (US)

(73) Assignee: Prysm, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/053,903

(22) Filed: Aug. 3, 2018

(65) Prior Publication Data
US 2018/0348621 A1   Dec. 6, 2018

Related U.S. Application Data

(63) Continuation of application No. 15/632,269, filed on Jun. 23, 2017, which is a continuation of application No. 14/878,947, filed on Oct. 8, 2015, now Pat. No. 9,690,181.

(51) Int. Cl.
*G03B 21/56* (2006.01)
*H04N 9/31* (2006.01)
*G02B 5/20* (2006.01)

(52) U.S. Cl.
CPC ............ *G03B 21/56* (2013.01); *G02B 5/201* (2013.01); *G03B 21/567* (2013.01); *H04N 9/3129* (2013.01); *H04N 9/3138* (2013.01); *H04N 9/3164* (2013.01)

(58) Field of Classification Search
CPC ........ G03B 21/56; G03B 21/60; G03B 21/62; G02B 5/201; H04N 9/3138
See application file for complete search history.

(56) References Cited

U.S. PATENT DOCUMENTS

| 8,203,785 B2 * | 6/2012 | Kindler .................. | G03B 21/56 345/84 |
| 9,690,181 B2 * | 6/2017 | Graves ................. | G03B 21/567 |
| 2007/0228927 A1 | 10/2007 | Kindler | |
| 2009/0116107 A1 | 5/2009 | Kindler | |
| 2009/0213464 A1 | 8/2009 | Kurachi | |
| 2014/0071684 A1 | 3/2014 | Ralli | |

* cited by examiner

*Primary Examiner* — Christopher E Mahoney
(74) *Attorney, Agent, or Firm* — Fish & Richardson P.C.

(57) ABSTRACT

A display screen includes a filter layer, a fluorescent layer having parallel fluorescent stripes, and an attachment layer between an excitation side of the fluorescent layer and a first side of the filter layer to attach the excitation side of fluorescent layer to the filter layer while providing vertical separation therebetween. The attachment layer includes attachment regions that are separated from each other by lateral spacings such that excitation-side air gaps are formed between areas of the fluorescent layer and the filter layer that correspond to the lateral spacings. During display operation, excitation light received on a second side of the filter layer propagates through to the first side of the filter layer, and at least a portion of the excitation light that propagates from the second side of the filter layer travels through the excitation-side air gaps to excite the fluorescent stripes.

20 Claims, 11 Drawing Sheets

MULTILAYERED SCREENS FOR SCANNING BEAM DISPLAY SYSTEMS

CROSS REFERENCE TO RELATED APPLICATIONS

This application is a continuation of and claims priority to U.S. patent application Ser. No. 15/632,269, filed on Jun. 23, 2017, which is a continuation of and claims priority to U.S. patent application Ser. No. 14/878,947, filed on Oct. 8, 2015, the entire contents of each of which are hereby incorporated by reference.

TECHNICAL FIELD

This application generally relates to multilayered fluorescent screens for use in display systems that scan one or more optical beams onto a screen to display images.

BACKGROUND

Display systems can be configured to use screens with fluorescent materials to emit colored light under optical excitation, such as laser-based image and video displays and screen designs for such displays.

Image and video displays can be designed to directly produce light of different colors that carry color images and to project the color images on a screen, where the screen makes the color images visible to a viewer by reflection, diffusion, or scattering of the received light and does not emit light. Examples of such displays include digital light processing (DLP) displays, liquid crystal on silicon (LCoS) displays, and grating light valve (GLV) displays. Some other image and video displays may use a light-emitting screen that produces light of different colors to form color images. Examples of such display systems include cathode-ray tube (CRT) displays, plasma displays, back-lit liquid crystal displays (LCDs), light-emitting-diode (LED) displays (e.g., organic LED displays), and field-emission displays (FEDs).

SUMMARY

According to one aspect, a display screen includes a filter layer having a first side and an opposing second side, a fluorescent layer including a plurality of parallel fluorescent stripes, and an attachment layer positioned between an excitation side of the fluorescent layer and the first side of the filter layer to attach the excitation side of fluorescent layer to the filter layer while providing vertical separation between the fluorescent layer and the filter layer. The attachment layer includes a plurality of attachment regions that are separated from each other by one or more lateral spacings such that one or more excitation-side air gaps are formed between areas of the fluorescent layer and the filter layer that correspond to the one or more lateral spacings in the attachment layer. During display operation, excitation light received on the second side of the filter layer propagates through to the first side of the filter layer, and at least a portion of the excitation light that propagates from the second side of the filter layer travels through the one or more excitation-side air gaps to excite the fluorescent stripes.

Implementations according to this aspect may include one or more of the following features. For example, the attachment layer may include a plurality of attachment stripes that contact the excitation side of the fluorescent stripes at their edge regions. The plurality of attachment stripes may extend parallel to the fluorescent stripes. The plurality of attachment stripes may bridge spaces between adjacent fluorescent stripes. In some cases, the plurality of attachment stripes may extend transverse to the fluorescent stripes. The attachment layer may be formed from a UV-curable resin. The attachment regions may be positioned to not overlap with center regions of the fluorescent stripes. The plurality of fluorescent stripes may be spaced apart from each other such that in-plane air gaps are formed between adjacent fluorescent stripes. In some cases, the display screen may also include a sheet layer having a first side and an opposing second side, and an adhesive layer positioned between a viewer side of the fluorescent layer and the second side of the sheet layer to attach the viewer side of fluorescent layer to the sheet layer while providing vertical separation between the fluorescent layer and the sheet layer, the adhesive layer defining openings such that one or more viewer-side second air gaps are formed between areas of the fluorescent layer and the sheet layer that correspond to the one or more openings in the adhesive layer, wherein, during display operation, at least a portion of the fluorescent light that emanates from the fluorescent layer travels through the one or more viewer-side air gaps.

The display screen according to this aspect may also include a sheet layer having a first side and an opposing second side, and an adhesive layer positioned between a viewer side of the fluorescent layer and the second side of the sheet layer to attach the viewer side of fluorescent layer to the sheet layer while providing vertical separation between the fluorescent layer and the sheet layer, the adhesive layer defining openings such that one or more viewer-side air gaps are formed between areas of the fluorescent layer and the sheet layer that correspond to the one or more openings in the adhesive layer, wherein, during display operation, at least a portion of the fluorescent light that emanates from the fluorescent layer travels through the one or more viewer-side air gaps. The adhesive layer may have an anti-aliasing pattern configured to reduce moiré patterns in an image displayed on the display screen. The plurality of fluorescent stripes may be spaced apart from each other such that in-plane second air gaps are formed between adjacent fluorescent stripes. The adhesive layer may include a cross-hatch pattern. The adhesive layer may include a sinusoidal pattern. The attachment layer may include a plurality of attachment stripes that extend perpendicular to the fluorescent stripes. The attachment layer may include a plurality of attachment posts are narrower in width than the in-plane gaps that separate the fluorescent stripes.

According to another aspect, a display screen includes a filter layer having a first side and an opposing second side, a fluorescent layer including a plurality of parallel fluorescent stripes, and an attachment layer positioned between an excitation side of the fluorescent layer and the first side of the filter layer to attach the excitation side of fluorescent layer to the filter layer while providing vertical separation between the fluorescent layer and the filter layer, the attachment layer including a plurality of attachment regions that underlie a first region of the fluorescent stripes and that are separated from each other by one or more lateral spacings. One or more excitation-side low-index gaps are formed in the one or more lateral spacings in between areas of the fluorescent layer and the filter layer, the low-index gaps underlying a second region of the fluorescent stripes different from the first region of the fluorescent stripes. During display operation, excitation light received on the second side of the filter layer propagates through to the first side of the filter layer, and at least a portion of the excitation light that propagates from the second side of the filter layer travels through the one or more excitation-side low-index gaps to excite the fluorescent stripes.

Implementations of this aspect may include one or more of the following features. For example, the low-index air gaps may partially underlie spaces between adjacent fluorescent stripes. The low-index air gaps may occupy spaces between adjacent fluorescent stripes. In some cases, the low-index gaps may be air gaps.

Potential advantages may include one or more of the following. Placement of an air gap above and below the phosphor layer can increase brightness and reduce cross-talk. Ambient contrast can be improved. The air gaps can be manufactured reliably with uniform stand-off from device-to-device.

The details of one or more embodiments are set forth in the accompanying drawings and the description below. Other aspects, features and advantages will be apparent from the description, drawings and claims.

DESCRIPTION OF DRAWINGS

Like reference symbols in the various drawings indicate like elements.

DETAILED DESCRIPTION

Figure 1:
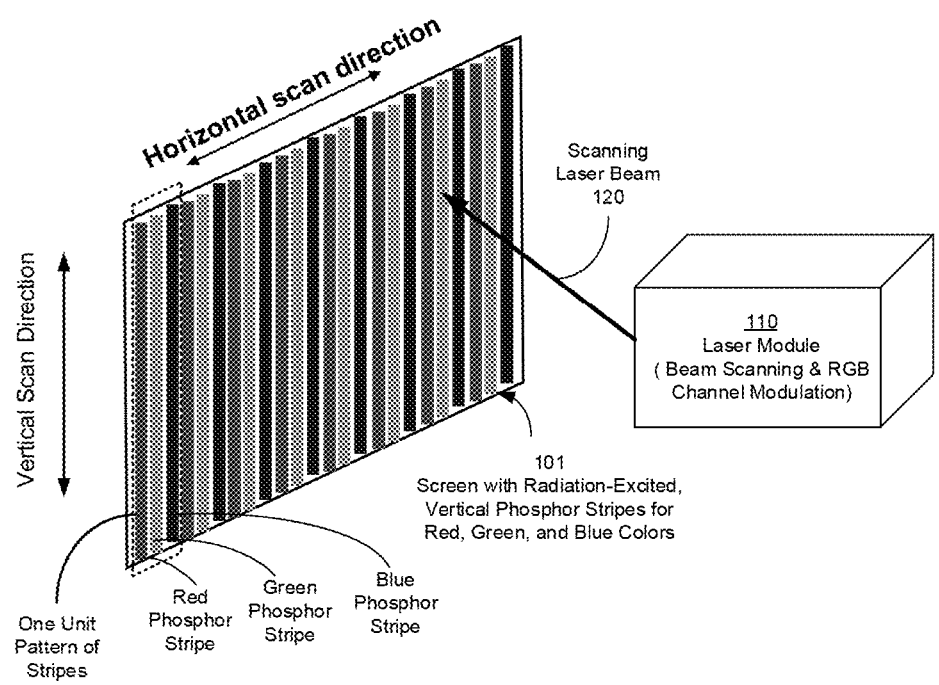
FIG. 1 is a schematic diagram of an example scanning beam display system having a screen having fluorescent stripes.

Display systems that use screens with fluorescent materials to emit colored light under optical excitation can be implemented in various configurations. For example, fluorescent materials can be included in a screen to absorb the light of the one or more scanning optical beams and to emit new light that forms the images. The fluorescent materials convert excitation energy applied to the screen into the emitted visible light, e.g., via absorption of excitation light. The emitted visible light forms images visible to a viewer.

Objectives for a commercial display screen include brightness and contrast. Supporting the fluorescent layer with an air gap between the fluorescent layer and the underlying support substrate can increase brightness and reduce cross-talk. Without being limited to any particular theory, the air gap can decrease internal absorption of light emitted from the fluorescent layer at large angles relative to the direction normal to the screen surface. This can reduce the likelihood of emitted light crossing into adjacent pixels, and thus can reduce cross-talk and improve contrast. Similarly, since more emitted light is internally reflected back toward the viewer side of the screen, brightness can be increased. Moreover, the air gap can reduce the amount of the emission that is coupled to the supporting substrate. Otherwise, the coupled emission may propagate in the supporting substrate and cause excitation of adjacent phosphor layers.

Scanning beam display systems using such a light-emitting screens can include fluorescent materials arranged to provide a pattern of light-emitting regions that emit light for forming images and non-light-emitting regions that are spaces void of light-emitting materials between the light-emitting regions. The pattern of the light-emitting regions and non-light-emitting regions can be in various configurations, e.g., one or more arrays of parallel light-emitting stripes, one or more arrays of isolated light-emitting island-like regions or pixel regions, or other design patterns. The geometries of the light-emitting regions can be various shapes and sizes, e.g., squares, rectangles or stripes. Examples described below use a light-emitting screen that has parallel light-emitting stripes separated by non-light-emitting lines located between the light-emitting stripes. Each light-emitting stripe can include a light-emitting material such as a phosphor-containing material that either forms a contiguous stripe line or is distributed in separated regions along the stripe.

In some implementations, three different color phosphors or phosphor combinations that are optically excitable by the laser beam to respectively produce light in red, green, and blue colors suitable for forming color images may be formed on the screen as pixel dots or repetitive red, green and blue phosphor stripes in parallel. Various examples described in this application use screens with parallel color phosphor stripes for emitting light in red, green, and blue to illustrate various features of the laser-based displays.

Phosphor materials are one type of fluorescent materials. Various described systems, devices and features in the examples that use phosphors as the fluorescent materials are applicable to displays with screens made of other optically excitable, light-emitting, non-phosphor fluorescent materials, such as quantum dot materials that emit light under proper optical excitation (semiconductor compounds such as, among others, CdSe and PbS).

Examples of scanning beam display systems described here use at least one scanning laser beam to excite color light-emitting materials deposited on a screen to produce color images. The scanning laser beam is modulated to convey image information for red, green and blue colors or in other visible colors and is controlled in such a way that the laser beam excites the color light-emitting materials in red, green and blue colors based on image data from the red, green and blue color channels of the image, respectively. Hence, the scanning laser beam carries the image data but does not directly produce the visible light seen by a viewer. Instead, the color light-emitting fluorescent materials on the screen absorb the energy of the scanning laser beam and emit visible light in red, green and blue or other colors to generate actual color images seen by the viewer.

Laser excitation of the fluorescent materials using one or more laser beams with energy sufficient to cause the fluorescent materials to emit light or to luminesce is one of various forms of optical excitation. In other implementations, the optical excitation may be generated by a non-laser light source that is sufficiently energetic to excite the fluorescent materials used in the screen. Examples of non-laser excitation light sources include various light-emitting diodes (LEDs), light lamps and other light sources that produce light at a wavelength or a spectral band to excite a fluorescent material that converts the light of a higher energy into light of lower energy in the visible range. The excitation optical beam that excites a fluorescent material on the screen can be at a frequency or in a spectral range that is higher in frequency than the frequency of the emitted visible light by the fluorescent material. Accordingly, the excitation optical beam may be in the violet spectral range and the ultra violet (UV) spectral range, e.g., wavelengths under 420 nm. In the examples described below, UV light or a UV laser beam is used as an example of the excitation light for a phosphor material or other fluorescent material and may be light at other wavelength. In the above and other display implementations, multiple display screens can be placed adjacent to one another in an array to form a larger display screen.

Referring to FIG. 1, an example of a laser-based display system using a screen having color phosphor stripes is shown. Alternatively, color phosphor dots or quantum dot or quantum dot regions may also be used to define the image pixels on the screen. The illustrated system includes a laser module 110 to produce and project at least one scanning laser beam 120 onto a screen 101. The screen 101 has parallel color phosphor stripes in the vertical direction where red phosphor absorbs the laser light to emit light in red, green phosphor absorbs the laser light to emit light in green and blue phosphor absorbs the laser light to emit light in blue. Each group of three adjacent color phosphor stripes contains stripes for the three different colors. One particular spatial color sequence of the stripes is shown in FIG. 2B as red, green and blue. Other color sequences may also be used.

The laser beam 120 is at the wavelength within the optical absorption bandwidth of the color phosphors. The laser beam 120 can be at a wavelength shorter than the visible blue, green and red colors for the color images. As an example, the color phosphors may be phosphors that absorb UV light in the spectral range from about 380 nm to about 420 nm to produce desired red, green and blue light.

The laser module 110 can include one or more lasers such as UV diode lasers to produce the beam 120, a beam scanning mechanism to scan the beam 120 horizontally and vertically to render one image frame at a time on the screen 101, and a signal modulation mechanism to modulate the beam 120 to carry the information for image channels for red, green and blue colors. Such display systems may be configured as rear light engine systems where the viewer and the laser module 110 are on the opposite sides of the screen 101. Alternatively, such display systems may be configured as front light engine systems where the viewer and laser module 110 are on the same side of the screen 101.

Figure 2A:
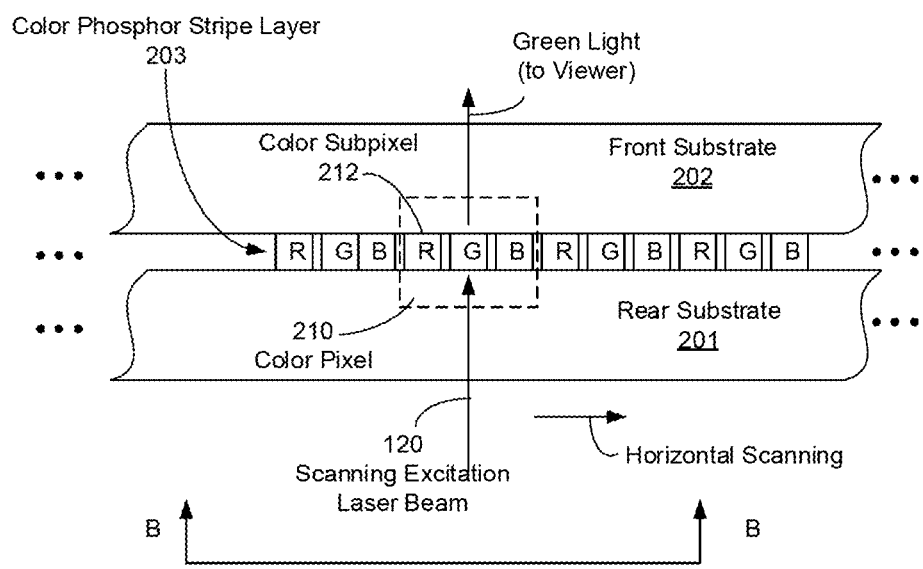
FIG. 2A is a schematic cross-sectional side view of the screen in FIG. 1.
Figure 2B:
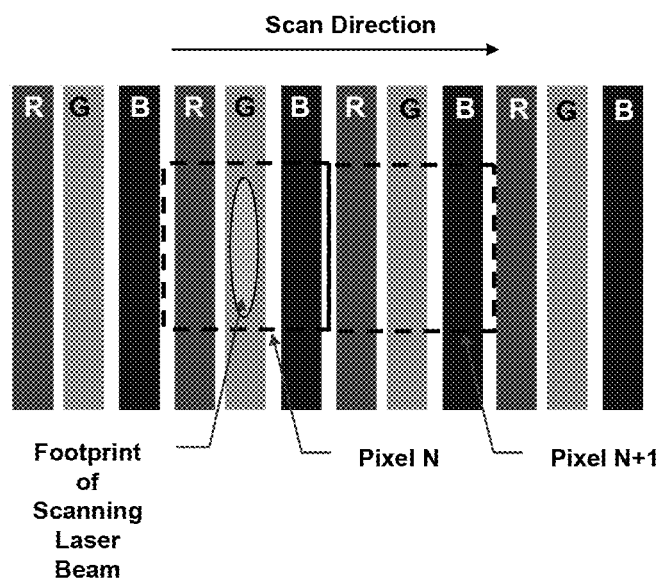
FIG. 2B is a schematic close-up front view of the screen in FIG. 2A along the direction B-B.

In the example scenario illustrated in FIG. 2A, the scanning laser beam 120 is directed at the green phosphor stripe within a pixel to produce green light for that pixel. FIG. 2B further shows the operation of the screen 101 in a view along the direction B-B perpendicular to the surface of the screen 101. Since each color stripe is longitudinal in shape, the cross section of the beam 120 may be shaped to be elongated along the direction of the stripe to maximize the fill factor of the beam within each color stripe for a pixel. This may be achieved by using a beam shaping optical element in the laser module 110.

The laser source that is used to produce a scanning laser beam that excites a phosphor material on the screen may be a single mode laser or a multimode laser. The laser may also be a single mode along the direction perpendicular to the elongated direction phosphor stripes to have a small beam spread that is confined by the width of each phosphor stripe. Along the elongated direction of the phosphor stripes, this laser beam may have multiple modes to spread over a larger area than the beam spread in the direction across the phosphor stripe. This use of a laser beam with a single mode in one direction to have a small beam footprint on the screen and multiple modes in the perpendicular direction to have a larger footprint on the screen allows the beam to be shaped to fit the elongated color subpixel on the screen and to provide sufficient laser power in the beam via the multi-modes to ensure sufficient brightness of the screen.

Accordingly, the laser beam 120, which is modulated to carry optical pulses with image data, needs to be aligned with respect to proper color pixels on the screen 101. The laser beam 120 is scanned spatially across the screen 101 to hit different color pixels at different times. Accordingly, the modulated beam 120 carries the image signals for the red, green and blue colors for each pixel at different times and for different pixels at different times. Hence, the beams 120 are coded with image information for different pixels at different times. The beam scanning thus maps the timely coded image signals in the beams 120 onto the spatial pixels on the screen 101.

Figure 3:
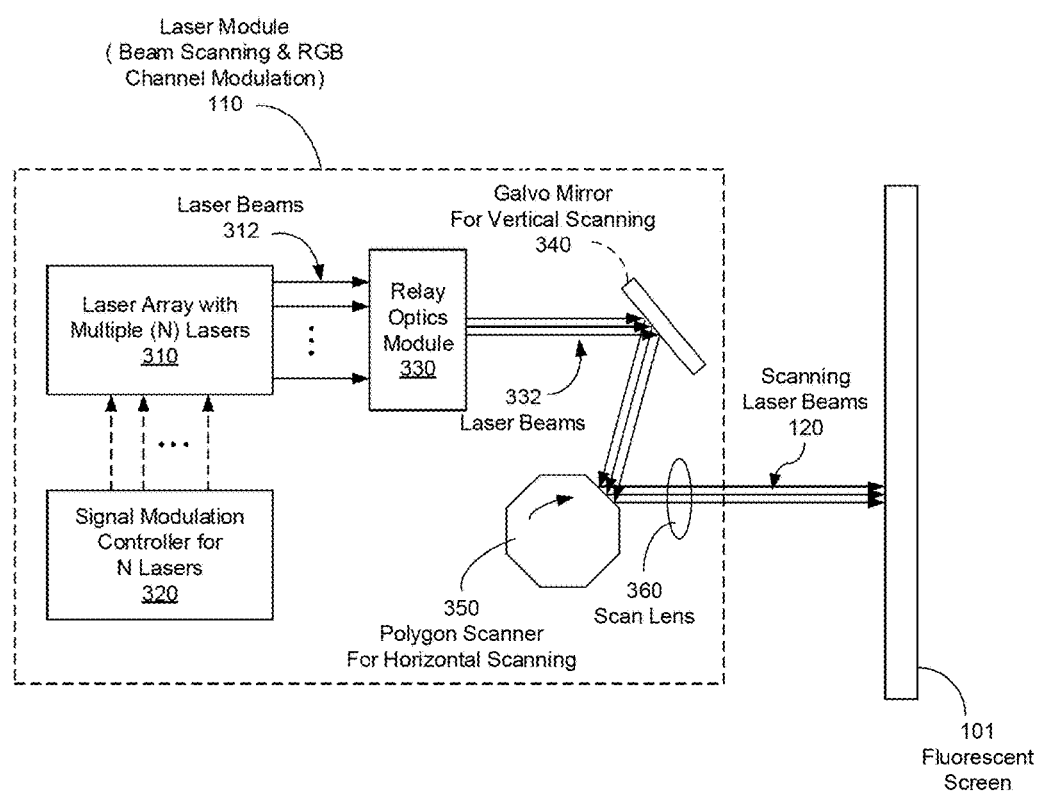
FIG. 3 is a schematic diagram of an example implementation of the laser module in FIG. 1 having multiple lasers that direct multiple laser beams on the screen.

Referring now to FIG. 3, an example implementation of the laser module 110 in FIG. 1 is illustrated. A laser array 310 with multiple lasers is used to generate multiple laser beams 312 to simultaneously scan the screen 101 for enhanced display brightness. A signal modulation controller 320 is provided to control and modulate the lasers in the laser array 310 so that the laser beams 312 are modulated to carry the image to be displayed on the screen 101. The signal modulation controller 320 can include a digital image processor that generates digital image signals for the three different color channels and laser driver circuits that produce laser control signals carrying the digital image signals. The laser control signals are then applied to modulate the lasers, e.g., the currents for laser diodes, in the laser array 310.

The beam scanning can be achieved by using a scanning mirror 340 such as a galvo mirror for the vertical scanning and a multi-facet polygon scanner 350 for the horizontal scanning. A scan lens 360 can be used to project the scanning beams form the polygon scanner 350 onto the screen 101. The scan lens 360 is designed to image each laser in the laser array 310 onto the screen 101. Each of the different reflective facets of the polygon scanner 350 simultaneously scans N horizontal lines where N is the number of lasers.

In the illustrated example, the laser beams are first directed to the galvo mirror 340 and then from the galvo mirror 340 to the polygon scanner 350. The output scanning beams 120 are then projected onto the screen 101. A relay optics module 330 is placed in the optical path of the laser beams 312 to modify the spatial property of the laser beams 312 and to produce a closely packed bundle of beams 332 for scanning by the galvo mirror 340 and the polygon scanner 350 as the scanning beams 120 projected onto the screen 101 to excite the phosphors and to generate the images by colored light emitted by the phosphors.

The laser beams 120 are scanned spatially across the screen 101 to hit different color pixels at different times. Accordingly, each of the modulated beams 120 carries the image signals for the red, green and blue colors for each pixel at different times and for different pixels at different times. Hence, the beams 120 are coded with image information for different pixels at different times by the signal modulation controller 320. The beam scanning thus maps the time-domain coded image signals in the beams 120 onto the spatial pixels on the screen 101. For example, the modulated laser beams 120 can have each color pixel time equally divided into three sequential time slots for the three color subpixels for the three different color channels. The modulation of the beams 120 may use pulse modulation techniques to produce desired grey scales in each color, a proper color combination in each pixel, and desired image brightness.

In one implementation, the multiple beams 120 are directed onto the screen 101 at different and adjacent vertical positions with two adjacent beams being spaced from each other on the screen 101 by one horizontal line of the screen 101 along the vertical direction. For a given position of the galvo mirror 340 and a given position of the polygon scanner 350, the beams 120 may not be aligned with each other along the vertical direction on the screen 101 and may be at different positions on the screen 101 along the horizontal direction. The beams 120 can only cover one portion of the screen 101. At a fixed angular position of the galvo mirror 340, the spinning of the polygon scanner 350 causes the beams 120 from N lasers in the laser array 310 to scan one screen segment of N adjacent horizontal lines on the screen 101. At end of each horizontal scan over one screen segment, the galvo mirror 340 is adjusted to a different fixed angular position so that the vertical positions of all N beams 120 are adjusted to scan the next adjacent screen segment of N horizontal lines. This process iterates until the entire screen 101 is scanned to produce a full screen display.

The stripe design in FIG. 2B for the fluorescent screen 101 in FIGS. 1 and 3 can be implemented in various configurations. FIG. 2A shows one example which places the fluorescent layer 203 such as a color phosphor stripe layer between two substrates 201 and 202. In a rear projection system, it may be desirable that the screen 101 couple as much light as possible in the incident scanning excitation beam 120 into the fluorescent layer with while maximizing the amount of the emitted light from the fluorescent layer that is directed towards the viewer side. A number of screen mechanisms can be implemented, either individually or in combination, in the screen 101 to enhance the screen performance, including efficient collection of the excitation light, maximization of fluorescent light directed towards the viewer side, enhancement of the screen contrast and reduction the screen glare. The structure and materials of the screen 101 can be designed and selected to meet constraints on cost and other requirements for specific applications.

Figure 4:
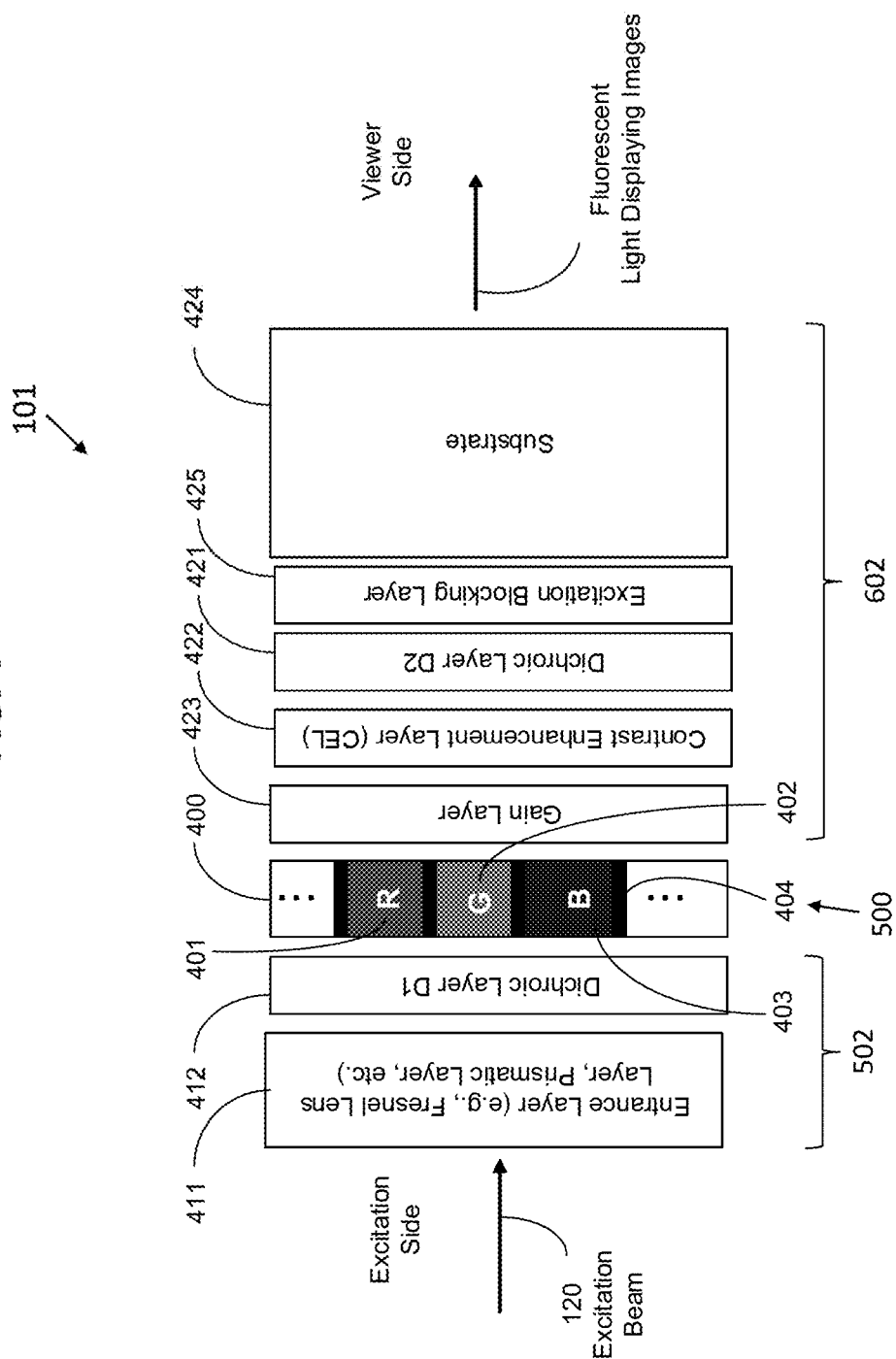
FIG. 4 is a schematic exploded cross-sectional side view of an example screen having a fluorescent stripe layer with fluorescent stripes for emitting red, green and blue colors under optical excitation of the scanning excitation light.

FIG. 4 illustrates an example screen 101 having a fluorescent layer 400 with fluorescent stripes for emitting red, green and blue colors under optical excitation of the scanning excitation light. A number of screen features are illustrated as examples and can be selectively implemented in specific screens. Hence, a particular fluorescent screen having only some of the features illustrated in FIG. 4 may be sufficient for a particular display application.

The fluorescent layer 400 includes parallel fluorescent stripes with repetitive color patterns such as red, green and blue phosphor stripes. The fluorescent stripes extend perpendicular to the horizontal scan direction of the scanning excitation beam 120 shown in FIG. 1. As illustrated in FIG. 4 and in FIG. 2B, each display pixel on the screen includes three subpixels which are portions of adjacent red, green and blue stripes 401, 402 and 402. The dimension of each subpixel along the horizontal direction is defined by the width of each stripe and the dimension along the vertical direction is defined by the beam width along the vertical direction.

A stripe divider 404 may be formed between any two adjacent fluorescent stripes to minimize or reduce the cross talk between two adjacent subpixels. As a result, the smearing at a boundary between two adjacent subpixels within one color pixel and between two adjacent color pixels can be reduced, and the resolution and contrast of the screen can be improved.

In some implementations, the stripe divider is a low-index material (i.e., lower index of refraction than the material of the stripe). For example, each stripe can be separated from an adjacent stripe by an air gap.

If the stripe divider is a solid material, it can be optically reflective and opaque, or optically absorbent. In some implementations, the stripe divider is comparable or higher index material than the stripe, but is optically reflective and opaque or optically absorbent. The sidewalls of each stripe divider 404 can be made optically reflective to improve the brightness of each subpixel and the efficiency of the screen.

The fluorescent layer 400 is an optically active layer in the context that the excitation light at the excitation wavelength is absorbed by the fluorescent materials and is converted into visible fluorescent light of different colors for displaying the images to the viewer. In this regard, the fluorescent layer 400 is also the division between the "excitation side" and the "viewer side" of the screen where the optical properties of the two sides are designed very differently in order to achieve desired optical effects in each of two sides to enhance the screen performance. Examples of such optical effects include, enhancing coupling of the excitation beam 120 into the fluorescent layer, recycling reflected and scattered excitation light that is not absorbed by the fluorescent layer 400 back into the fluorescent layer 400, maximizing the amount of the emitted visible light from the fluorescent layer 400 towards the viewer side of the screen, reducing screen glare to the viewer caused by reflection of the ambient light, blocking the excitation light from existing the screen towards the viewer, and enhancing the contrast of the screen. Various screen elements can be configured to achieve one or more of these optical effects. Several examples of such screen elements are illustrated in FIG. 4.

The fluorescent screen 101 in FIG. 4 can include a substrate layer 424 to provide a rigid structural support for various screen components. This substrate layer 424 can be a thin substrate or a rigid sheet. When placed on the viewer side of the fluorescent layer 400 as illustrated in FIG. 4, the substrate layer 424 can be made of a material transparent or partially transparent to the visible colored light emitted by the fluorescent stripes 401, 402, 403. A partial transparent material can have a uniform attenuation to the visible light including the three colors emitted by the fluorescent stripes to operate like an optical neutral density filter. The substrate layer 424 can be made of a plastic material, a glass material, or other suitable dielectric material. For example, the substrate layer 424 may be made of an acrylic rigid sheet. The thickness of the substrate layer 424 may be a few millimeters in some designs. In addition, the substrate layer 424 may be made reflective and opaque to the excitation light of the excitation beam 120 to block the excitation light from reaching the viewer and to recycle the unabsorbed excitation light back to the fluorescent layer 400.

The substrate layer 424 can also be located on the excitation side of the fluorescent layer 400. Because the excitation beam 120 must transmit through the substrate layer 424 to enter the fluorescent layer 400, the material for the substrate layer 424 should be transparent to the excitation light of the excitation beam 120. In addition, the substrate layer 424 in this configuration may also be reflective to the visible light emitted by the fluorescent layer 400 to direct any emitted visible light coming from the fluorescent layer 400 towards the viewer side to improve the brightness of the displayed images.

In some implementations, the substrate layer 424 is not used or can be considered part of another component. For example, if the dichroic layer D1 412 is sufficiently rigid to support the components, then a separate substrate layer 424 may not be needed. In some implementations the components might only be supported by dichroic layer D1 412, with the dichroic layer being flexible or even rollable.

Referring further to FIG. 4, at the entry side of the screen facing the excitation beam 120, an entrance layer 411 can be provided to couple the excitation beam 120 into the screen 101. The entrance layer 411 can be a solid layer having smooth surfaces on both the viewer and excitation sides. For example, the entrance layer can be a layer of polyethylene terephthalate (PET).

In some implementations, servo marks may be formed, e.g., printed, on the excitation side of the entrance layer 411. The servo marks have a different reflectivity than the remaining excitation-side surface of the entrance layer 411, e.g., the servo marks can be more reflective. The servo marks can be specularly or diffusively reflective. A sensor can detect portion of the excitation beam reflected from the servo marks, and use this information to adjust timing of the modulation of the excitation beam. The servo marks can be aligned with the stripe dividers 404.

In some implementations, the entrance layer 411 can include a Fresnel lens layer to control the incidence direction of the scanning excitation beam 120. Alternatively or in addition, a prismatic layer or a high-index dielectric layer can also be used as part of the entrance layer 411 to recycle light back into the screen including the excitation light and the emitted visible light by the fluorescent layer. However, the entrance layer 411 can be omitted or provide the substrate layer.

To improve the brightness of the screen to the viewer, a first dichroic layer 412 (D1) can be placed in the path of the excitation beam 120 upstream from the fluorescent layer 400 to transmit light at the wavelength of the excitation beam 120 and to reflect visible light emitted by the fluorescent layer 400. The first dichroic layer 412 can reduce the optical loss of the fluorescent light and thus enhances the screen brightness. The first dichroic layer 412 can be provided by a stack of coextruded polymer layers.

On the viewer side of the fluorescent layer 400, a second dichroic layer 421 (D2) can be provided to transmit the visible light emitted by the fluorescent layer 400 and to reflect light at the wavelength of the excitation beam 120. Hence, the second dichroic layer 421 can recycle the excitation light that passes through the fluorescent layer 400 back to the fluorescent layer 400 and thus increases the utilization efficiency of the excitation light and the screen brightness. The second dichroic layer 421 can be provided by a stack of coextruded polymer layers.

On the viewer side of the fluorescent layer 400, an optional contrast enhancement layer 422 can be included to improve the screen contrast. The contrast enhancement layer 422 can include color-selective absorbing stripes that spatially correspond to and align with fluorescent stripes in the fluorescent layer 400 along the direction perpendicular to the screen layers. The color-selective absorbing stripes therefore transmit light in respective colors of the fluorescent stripes and absorb light in colors of other fluorescent stripes, respectively. Alternatively, the contrast enhancement layer 422 can be an optical neutral density filter layer that uniformly attenuates the visible light to reduce the glare of the screen due to the reflection of the ambient light. This neutral density filtering function may also be implemented in one or more other layers on the viewer side of the fluorescent layer 400, including the substrate layer 424.

In addition, the screen can include a screen gain layer 423 on the viewer side of the fluorescent layer 400 to optically enhance the brightness and viewing angle of the screen. The gain layer 423 may include a lenticular layer with lens elements, a diffractive optic layer of diffractive elements, a holographic layer with holographic elements, or a combination of these and other structures.

Furthermore, an excitation blocking layer 425 can be placed on the viewer side of the fluorescent layer 400 to block any excitation light from exiting the screen to the viewer side. This layer can be implemented by a material that transmits the visible light and absorbs the excitation light. For example, a polyester based color filter can be used as this layer to block the excitation light which may be radiation from 400-415 nm. In some implementations, this blocking filter may have transmission below 410 nm less than 0.01%, while having greater than 50% transmission above 430 nm. The neutral density filtering function can also be incorporated in this layer, e.g., having a uniform attenuation to the visible light between 430 nm and 670 nm. This blocking function can be incorporated into the substrate layer 424.

The spatial sequence of the layers 421-425 on the viewer side of the fluorescent layer 400 may be different from what is shown in FIG. 4.

Figure 5:
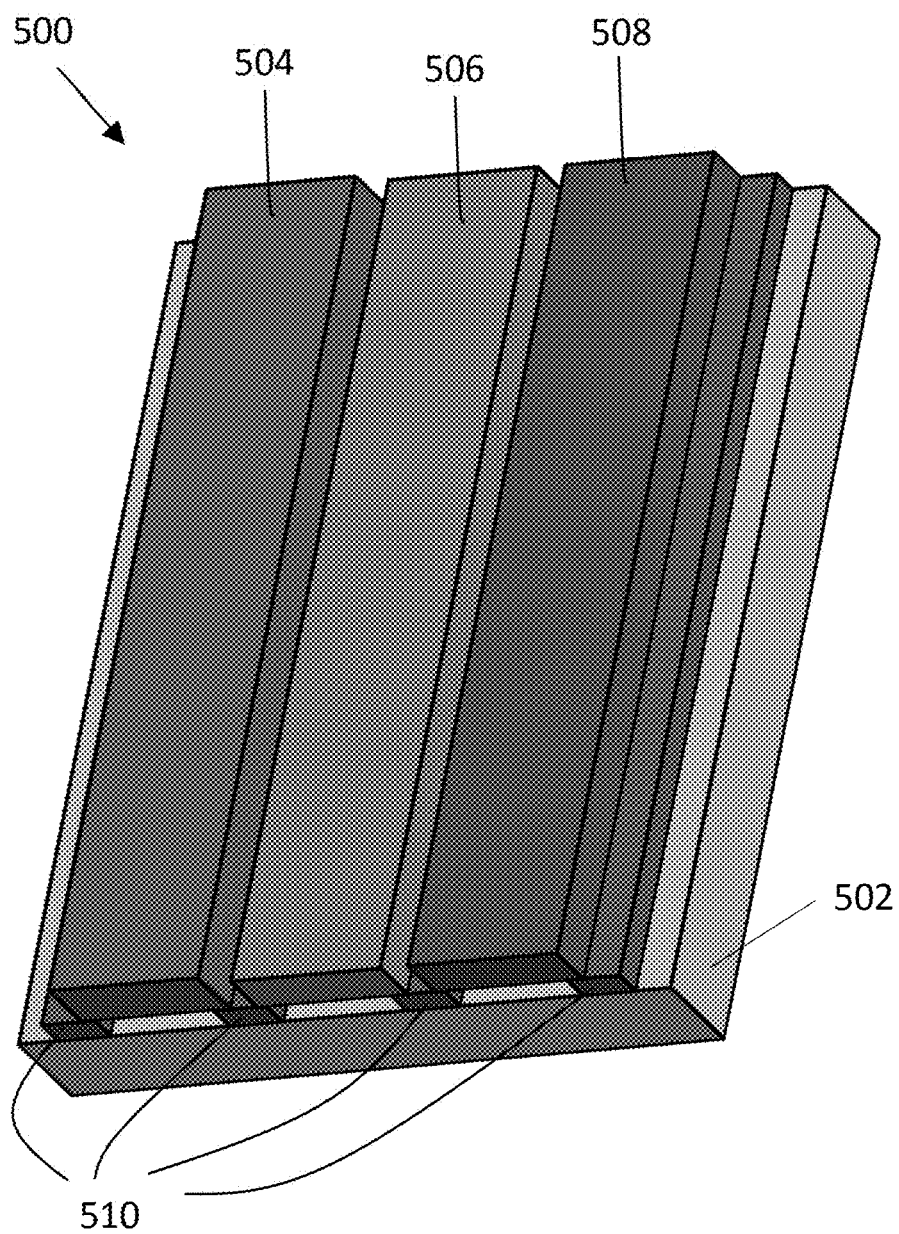
FIG. 5 is a schematic perspective view of a portion of an example screen having fluorescent stripes supported above a substrate.

Referring now to FIG. 5, an example fluorescent layer 500 formed on a supporting substrate 502 is shown. The fluorescent layer 500 can provide the fluorescent layer 400 from FIG. 4. The fluorescent layer 500 can include parallel fluorescent stripes. The stripes can be arranged in a pattern, for example, with three adjacent stripes 504, 506, 508 for emitting blue, green, and red light, respectively. The stripes in the fluorescent layer 500 need not be totally flat, e.g., they may have rounded corners or have an oval cross-section.

The substrate 502 may be a rigid substrate, or alternatively, may be a flexible sheet. In some cases, the substrate 502 may be a dichroic filter layer (e.g. a color mirror, or CM, layer), that can pass excitation light while reflecting visible light. Thus, the substrate 502 can provide the first dichroic layer 412 and/or substrate 424 from FIG. 4. As a dichroic filter, the substrate 502 can be formed of co-extruded polymer layers of alternating high and low refractive index. In some cases, the substrate 502, as well as the fluorescent layer 500 that is attached to the substrate 502, may be sufficiently flexible that it can be wound around a roller. For example, the resulting flexibility of the substrate 502 and the attached fluorescent layer 500 may be such that they can be rolled around a roller having a diameter as low as 25 mm without damage to the assembly. In some cases, the substrate 502 may be a CM layer having a thickness of approximately 90 µm.

In particular, referring to FIGS. 3 and 4, the substrate 502 can include both the dichroic filter layer 412 and the entrance layer 411. The entrance layer 411 can be a polymer layer, e.g., a layer of polyethylene terephthalate (PET), with smooth surfaces on the viewer and excitation sides. The dichroic filter later 412 can be attached to a substrate layer 424 by a pressure sensitive adhesive layer.

Figure 6:
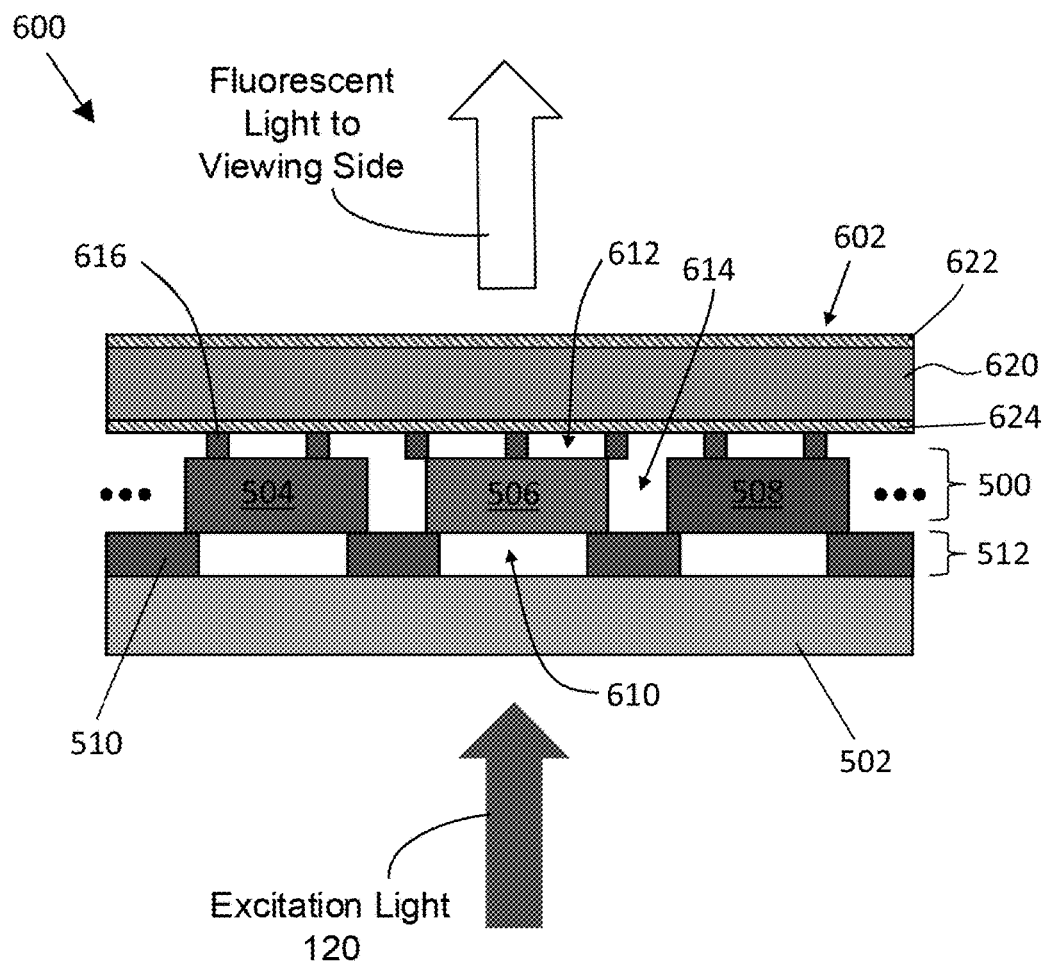
FIG. 6 is a schematic cross-sectional side view of the fluorescent screen in FIG. 5.

As illustrated in FIGS. 5 and 6, the fluorescent layer 500 (made up in this instance of stripes 504, 506, 508) are supported at their underside (i.e., the excitation side) by an attachment layer 512 that attaches the excitation side of the fluorescent layer 500 to the substrate 502.

In the illustrated implementation, the attachment layer 512 is made up of a plurality of attachment stripes 510 that each support an edge region of the corresponding fluorescent stripes 504, 506, 508. Such attachment layer, in this case the attachment stripes 510, has a sufficient thickness to provide vertical separation between the fluorescent layer 500 and the substrate layer 502. Accordingly, air gaps 610 are formed between the fluorescent layer 500 and the substrate layer 502 in regions not occupied by the attachment layer. Unsupported portions of the fluorescent layer 500 may sag or deform, and may come in contact with the underlying substrate layer 502. In some cases, such sagging or deformation can lead to a breakage in the fluorescent layer 500. However, selection of a sufficiently thick attachment stripe can accommodate the sag and reduce the likelihood that the portion of the fluorescent layer contact the substrate layer 502. In some cases, if the attachment stripes 510 are too soft, they can deform under the weight or tension of the fluorescent layer 500, causing portions of the fluorescent layer 500 to sag or deform along with the attachment stripes 510. To prevent this, the attachment stripes 510 should be sufficiently firm so as to avoid the fluorescent layer contacting the substrate layer 502, e.g., to undergo substantially no deformation when supporting the fluorescent layer. For example, UV curable resin may be used.

The "air gaps" between the fluorescent layer 500 and the substrate 502 can be filled with a gas, or there may be a vacuum in the gaps 610. The gas can be air, or a substantially pure gas, e.g., nitrogen. As further described below (see FIGS. 7A-7E), the attachment layer can be provided in various configurations other than the stripes 510. In some cases, the air gaps 610 may be filled with polymer or other non-gaseous materials having an index lower than that of the fluorescent layer 500.

The air gaps 610 (see FIG. 6) can allow excitation light emerging from the viewer side of the substrate 502 to reach the fluorescent layer 500 without propagating through another intermediary material. Such gaps that exist immediately below the fluorescent layer can help increase brightness, reduce light piping, and reduce cross-talk, among other potential benefits. By using the gaps to reduce light piping, which can occur when the phosphor touches the underlying substrate, light emanating from the phosphor can more efficiently reflect off the substrate to better reach the viewer. The attachment stripes 510, as well as other configurations of the attachment layer, can be made from a flexible material. In some cases, the attachment layer can be formed from a resin that is UV cured. The resin may be chosen so after curing it is transparent to the excitation light. In some cases, the resin may be chosen so after curing it is opaque to visible light.

Referring further to FIG. 6, an example fluorescent screen 101 includes the substrate layer 502, the fluorescent layer 500 that is attached to the substrate layer 502 via the attachment layer 512, and a cover substrate 602 that is attached to the viewer side of the fluorescent layer 500 via an adhesive layer 616.

The cover substrate 602 can provide the substrate 424 and/or excitation blocking layer 425 from FIG. 4. For example, the cover substrate 602 can include a polymer film 620, e.g., polyethylene terephthalate (PET). Various gain/enhancement/filter layers may be included on the viewer side of the fluorescent layer 500 (see, e.g., FIG. 4).

For example, the viewer side of the film 620 can be coated with a UV blocking layer 622 to help prevent or mitigate UV light from reaching the viewer. The UV blocking layer 622 should be non-yellowing to UV excitation.

As another example, the excitation side of the film 620 can be coated with a protective coating 624. The protective coating 625 can be a UV blocking layer. For example, a laser-stable red-shifted UV absorber, e.g., CarboProtect®, can be used to block the excitation light. Alternatively, or additionally, other protective or functional coatings such as hard coats, antiglare coats, anti-fingerprint coats, among others, may be used.

As shown in FIG. 6, the attachment layer 512 that is sandwiched between the fluorescent layer 500 and the substrate layer 502, in this case attachment stripes 510, help attach the excitation side of the fluorescent layer 500 to the viewer side of the substrate layer 502. Moreover, by being laterally spaced apart (i.e. by defining laterally spaced-apart regions) and by having a sufficient thickness to account for any variations in surface flatness of the surrounding layers, the attachment stripes 510 can help form air gaps 610 on the excitation side of the fluorescent layer 500. The thickness of the attachment layer helps determine the thickness of the resulting air gap 610, also referred to as excitation side air gaps 610. For example, the attachment layer may have a thickness of 10 µm, thereby creating an approximately 10 µm separation between the fluorescent layer 500 and the substrate layer 502.

On the viewer side, the cover substrate 602 can be attached to the fluorescent layer 500 via the adhesive layer 616. The adhesive layer 616, which can include a patterned layer of PSA (pressure sensitive adhesive), attaches the cover substrate 602 to the fluorescent layer 500 while ensuring separation between the excitation side of the cover substrate 602 and the viewer side of the fluorescent layer 500.

The thickness of the adhesive layer 616 is sufficient that air gaps 612, also referred to as viewer side air gaps 612, are formed between the cover substrate 602 in regions where the adhesive layer is absent. The thickness of the adhesive layer 616 can be selected to provide the viewer-side air gaps 612 on the viewer side of the fluorescent layer 500 while still accounting for any surface variations in the fluorescent layer 500. For example, the adhesive layer 616 can be between approximately 5 µm and 25 µm thick. The fluorescent layer 500 can have a thickness of between approximately 5 µm and 50 µm. The viewer side air gaps 612 can help, for example, reduce undesired image halo and enable the UV to be recycled back to the fluorescent layer 500 to increase the optical efficiency. The viewer side air gaps 612 can be filled with a gas, e.g., air or nitrogen, or there may be a vacuum in the viewer-side gaps 612.

The adhesive layer 616 can be made from PSA that exhibits minimal material flowing and good bonding strength between the fluorescent layer 500 and the cover substrate 602 (or any other layer that the viewer side of the fluorescent layer 500 is directly attached to). Additionally, the adhesive layer 616 can be made from PSA or other adhesive material that is of optical grade so as to optimize the visible light emanating from the excited phosphor and not introduce spurious light. Additionally, the adhesive layer 616 can be made from PSA that does not absorb UV light at 405 nm so as to reduce cross talk between the phosphor regions in the fluorescent layer 500.

In some implementations, the phosphor stripes 504, 506, 508 are to be spaced apart from each other in the plane of the fluorescent screen 500 by air gaps 614, also referred to as in-plane air gaps 614. The in-plane air gaps 614 can be filled with a gas, e.g., air or nitrogen, or there may be a vacuum in the viewer-side gaps 614. In some cases, the air gaps 614 may be filled with polymer or other non-gaseous materials having an index lower than that of the fluorescent layer 500.

By (i) creating separation in the out-of-plane direction between the fluorescent layer 500 and the substrate layer 500 using the attachment layer (e.g. attachment stripes 510) to create excitation side air gaps 610, by (ii) creating separation in the out-of-plane direction between the fluorescent layer 500 and the PET layer 602 using the adhesive layer 616 to create viewer side air gaps 612, and by (iii) creating separation between the phosphor stripes 504, 506, 508 of the fluorescent layer 500 to form in-plane air gaps 614, the amount of material that touches the phosphor stripes 504, 506, 508 can be minimized, thereby improving the displayed image by, among other things, increasing brightness, reducing light piping, and reducing cross-talk.

Referring now to FIGS. 7A to 7E, the attachment layer that attaches the excitation side of the fluorescent layer 500 to an underlying substrate (e.g. substrate 502) while providing a vertical separation therebetween such that air gaps are formed underneath the fluorescent layer, can take various forms. In general, in these various implementations, the attachment regions of the attachment layer are positioned at the edges of the fluorescent stripes 504, 506, 508, e.g., the outer 25% of the width on each side of the stripe. Conversely, the attachment regions are present in a center region of a stripes, e.g., the center half of the width of the stripe. In some implementations, the attachment regions are located only in the outer 10% of the width on each side of the stripe.

Figure 7A:
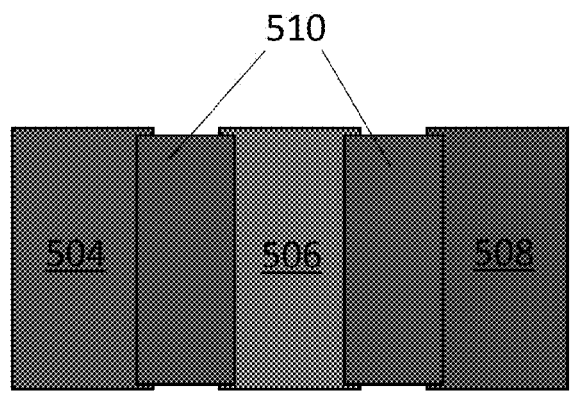
FIGS. 7A-7H are schematic bottom views illustrating various locations and shapes for the attachment layer relative to the fluorescent stripes.
Figure 7B:
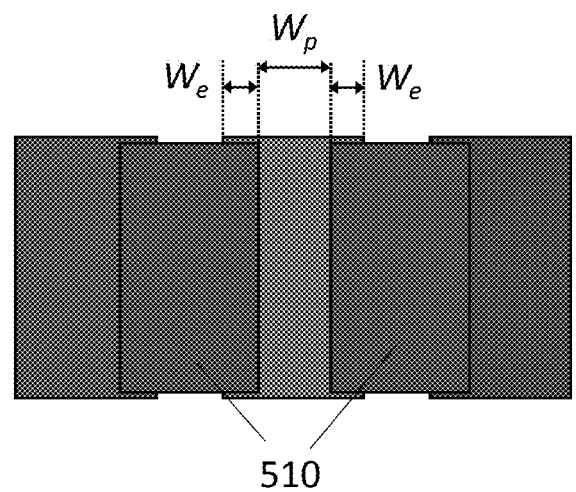

In FIGS. 7A-7B, the attachment stripes 510 are shown bridging the gap between phosphor stripes 504, 506, 508 that are disposed in spaced-apart fashion. The attachment stripes 510 extend in parallel to the fluorescent stripes.

As illustrated, each of the attachment stripes 510 should be narrow enough to increase the area of the excitation side of the phosphor stripes 504, 506, 508 is are exposed to provide for improved transmission of the excitation light to the fluorescent stripes, while remaining wide enough to provide structural support to the corresponding phosphor stripes 504, 506, 508. The attachment stripes 510 may be spaced at a pitch that corresponds to the pixel width of the pixel element. For example, if each of the phosphor stripes are spaced at a pitch of 500 μm to 550 μm to thereby result in the pixel width of approximately 1500 μm, the attachment stripes 510 may also be spaced at a pitch of between approximately 500 μm and 550 μm. To prevent formation of a moiré pattern, the pitch of the pixel element and the pitch of the adhesive stripes should be such that they do not result in superimposed patterns.

In FIG. 7B, the attachment stripes 510 are shown having a greater width than in FIG. 7A, thereby covering a larger portion of the phosphor stripes 504, 506, 508 from incoming excitation light. As illustrated, each of the attachment stripes 510 support and overlap with an edge region of each of the phosphor stripes 504, 506, 508. A width We of the overlapping edge region should be minimized to ensure optimized performance but should be wide enough to provide adequate structural support to the phosphor stripes 504, 506, 508 while accounting for manufacturing/alignment tolerance. For example, We can be around 30 μm. A width Wp, which corresponds to the width of the exposed region of the phosphor stripes 504, 506, 508 at the excitation side, should be maximized for optimized performance. In other words, the area percentage of the phosphor stripes 504, 506, 508 that is exposed to incoming excitation light, which in this case can be shown by the expression Wp/(Wp+2We), should be maximized. For example, the area percentage should be above 50% to ensure that enough excitation light impinges directly on the excitation of the phosphor stripes 504, 506, 508 after going through the excitation side air gaps 610. In some cases, the area percentage should be at or above 90% for superior performance.

Attachment stripes 510 that are transparent to the excitation light may be advantageous in that they can be made wider than opaque attachment stripes without adversely affecting the amount of excitation light that impinges on the phosphor layer. On the other hand, having an opaque attachment stripes may be advantageous as it can help stop excitation light from reaching the viewer without the need for a separate blocking film. In addition, the opaque layer can be very effective at blocking piping through to the excitation-side substrate that supports the phosphor layer. In some cases, the attachment stripes may be partially opaque. For example, the attachment stripe layer may be transparent but include opaque particles.

Although FIGS. 7A and 7B illustrate the attachment stripes 510 as bridging the gap between fluorescent stripes, this is not necessary. For example, each attachment stripe 510 could be positioned under an edge of a fluorescent stripes. The attachment stripe 510 could be positioned only under the fluorescent stripe, or extend partially past the edge of the fluorescent stripe without bridging the gap between fluorescent stripes.

Figure 7C:
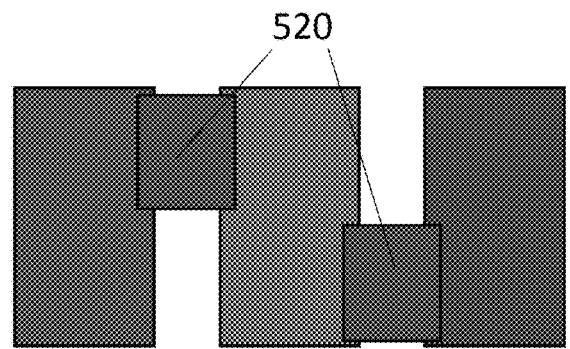
Figure 7D:
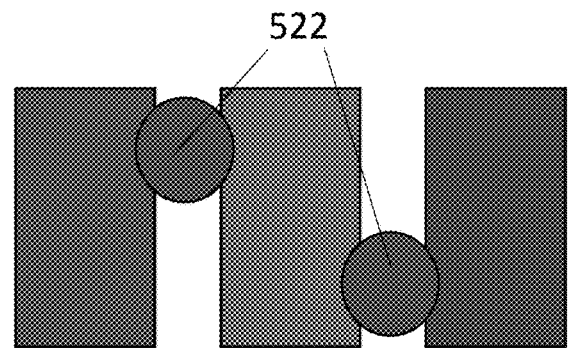

FIG. 7C shows attachment patches 520, which are similar to the attachment stripes 510 but differ in that they don't run along an entire length of the phosphor stripes. By supporting the phosphor stripes at just select locations along the edge regions as opposed to along an entire length of the edge regions, the size of the air gaps formed on the excitation side of the fluorescent layer may be increased. In some cases, as shown in FIG. 7D, attachment patches 522 having round or other shapes can be used.

Figure 7E:
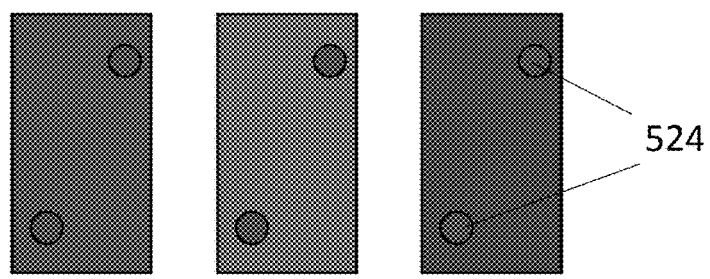
Figure 7F:
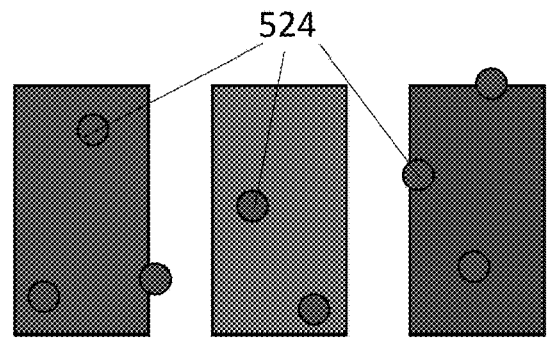

In some cases, as shown in FIG. 7E, the attachment layer can include attachment posts 524 that are narrower in width than the in-plane gaps that separate the phosphor stripes 502, 504, 506. In such cases, the attachment posts 524 may be positioned at various locations within the phosphor stripes 502, 504, 506 to thereby attach the excitation side of the fluorescent layer to the underlying substrates. In such cases, the sizes of the attachment posts 524 should be kept small to ensure that a minimal area of the phosphor stripes 502, 504, 506 is touched by the attachment posts 524 while providing sufficient structural support to the corresponding fluorescent stripe. As illustrated in FIG. 7F, attachment posts 524 may be randomly distributed between the fluorescent layer and the underlying substrate.

Figure 7G:
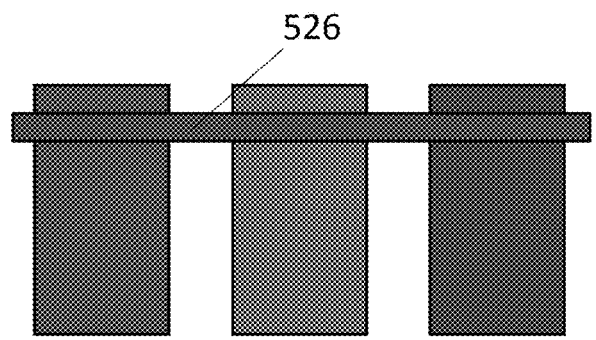
Figure 7H:
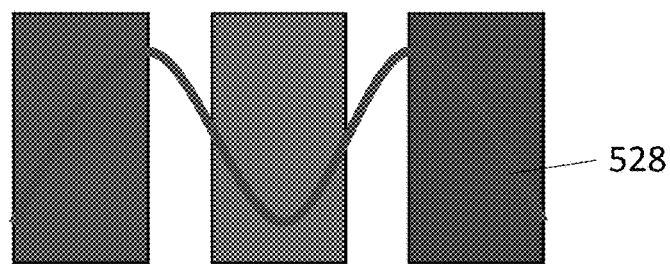

In some cases, as shown in FIG. 7G, an attachment stripe 526 may be oriented transverse (e.g. perpendicular) to the phosphor stripes. As shown in FIG. 7H, an attachment stripe 528 may include curved portions. A combination of the attachment layer variations illustrated in FIGS. 7A-7H, as well as other similar variations, may be used to attach the phosphor layer to the substrate while maintaining the air gap 610 on the excitation side of the phosphor layer.

Figure 8:
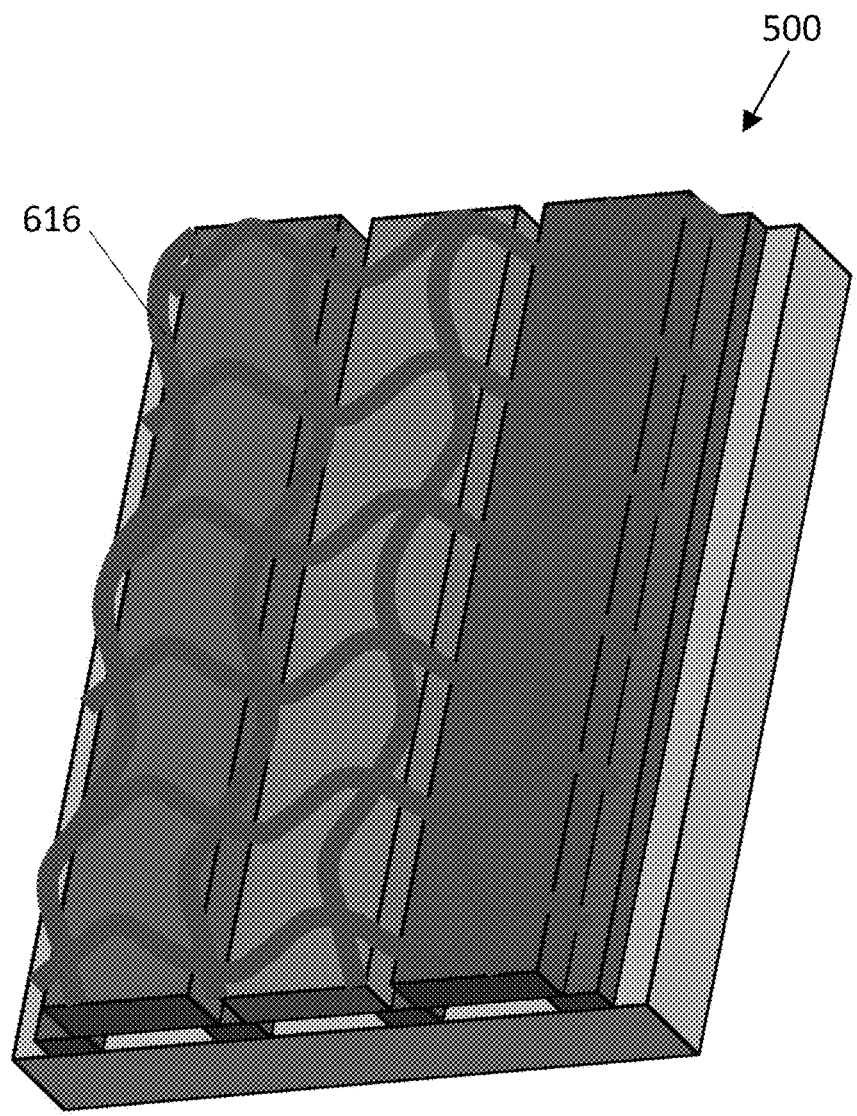
FIG. 8 is a schematic perspective view of a portion of an example screen having an adhesive layer above the fluorescent stripes.

Referring now to FIG. 8, the adhesive layer 616 on the viewer side of the fluorescent layer can have a pattern that is adapted to reduce moiré patterns that might otherwise be produced, for example, when images presented the display screen are captured by a digital image capturing device having a periodic light-sensing structure. Such moiré patterns may be produced due to the interference between the periodic light-emitting structures (e.g., periodic arrays of colored light-emitting pixels and/or sub-pixels) in the display device and the periodic light-sensing structures (e.g., periodic arrays of photo-sensors) in the image capturing device.

For instance, the anti-moiré pattern of the adhesive layer 616 may incorporate periodicity that does not line up with the periodicity of the phosphor stripes 502, 504, 506. In some cases, as shown in FIG. 8, the adhesive layer 616 may have a cross hatch pattern with rounded corners to minimize any alignment with the phosphor stripes. In some cases, the adhesive layer 616 may incorporate a sinusoidal pattern. In some cases, the adhesive layer 616 may include random or quasi-random elements to further eliminate any undesired alignment and periodicity that may give rise to moiré patterns in the displayed image or a digital capture thereof.

In some implementations, the adhesive layer 616 may have patterns similar to those on the excitation side of the fluorescent layer, for example as shown in FIGS. 7A-7H. Alternatively, the adhesive layer 616 may include a sawtooth pattern, a honeycomb pattern, and various overlapping or non-overlapping waver patterns.

Figure 9A:
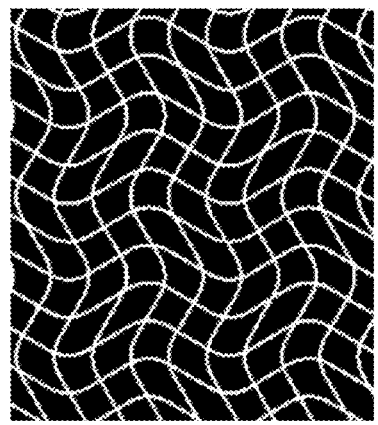
FIGS. 9A-9D are schematic top views illustrating various patterns for the adhesive layer above the fluorescent stripes.
Figure 9C:
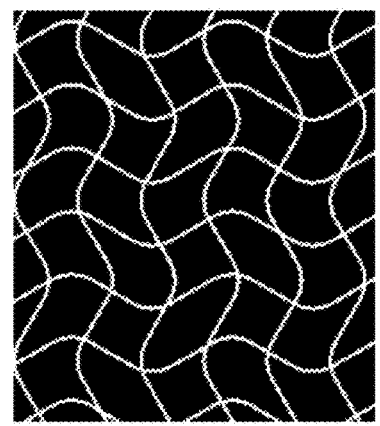
Figure 9B:
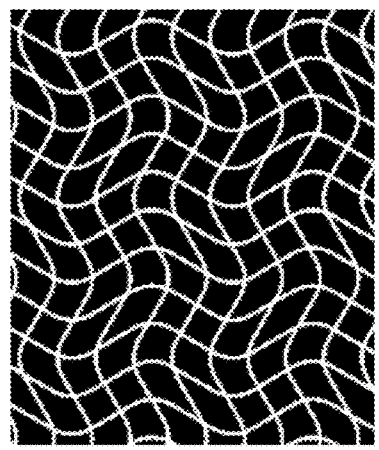
Figure 9D:
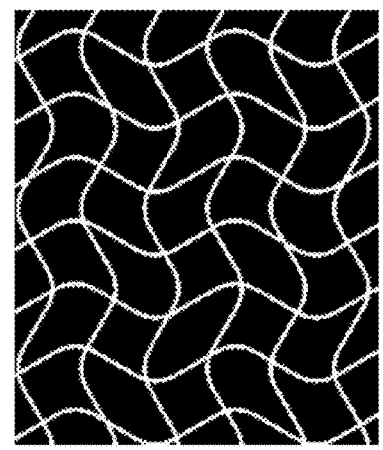

FIGS. 9A to 9D illustrate example variations to the cross-hatch anti-moiré pattern shown in FIG. 8. In FIG. 9A, the represented line spacing is 3 mm while the represented line width is 0.15 mm. For FIG. 9B, the corresponding values are 3 mm and 0.2 mm, thus indicating the use of a thicker (in the in-plane direction) of the adhesive layer 616. In FIG. 9C, the shown line spacing represents 5 mm while the shown line width is 0.15 mm. Compared to the patterns shown in FIGS. 9A and 9B, the lines in FIG. 9C are spaced farther part, thereby reducing the amount of bond area provided by the attachment layer. For FIG. 9D, the corresponding values represented are 5 mm and 0.2 mm. For FIGS. 9A to 9D, the sample patterns represent bond areas of 11.5%, 15.3%, 7.0%, and 9.3%, respectively.

While this document contains many specifics, these should not be construed as limitations on the scope of an invention or of what may be claimed, but rather as descriptions of features specific to particular embodiments of the invention. Certain features that are described in this document in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, it is understood that variations, enhancements, and other implementations can be made based on what is described and illustrated in this application.

For example, although multiple colors have been described, the techniques are applicable to a monochromatic system. Although the description focuses on color phosphors, the stripe can be other fluorescent materials, such as quantum dots. Although the description focuses on a laser for the excitation beam, other collimated light beams could be used, and the excitation beam could also be in the visible light range rather than UV. Although a rotating polygon is described for scanning the excitation beams, other kinds of scanners could be used, e.g., two mirror galvos could be used to deflect the excitation beams in two perpendicular directions.

What is claimed is:

1. A display screen comprising:
a filter layer;
a fluorescent layer including a plurality of fluorescent regions laterally separated by lateral-side air gaps; and
a first attachment layer positioned between the fluorescent layer and the filter layer, wherein the first attachment layer includes a plurality of first attachment sections that are laterally separated by excitation-side air gaps and that attach an excitation side surface of the plurality of fluorescent regions to the filter layer while providing vertical separation between the plurality of fluorescent regions and the filter layer,
a sheet layer positioned on a side of the fluorescent layer farther from the filter layer; and
a second attachment layer positioned between the fluorescent layer and the sheet layer, wherein the second attachment layer includes a plurality of second attachment sections that are laterally separated by viewer-side air gaps and that attach a viewer side surface of the plurality of fluorescent regions to the sheet layer while providing vertical separation between the fluorescent layer and the sheet layer,
wherein the plurality of first attachment sections and the plurality of second attachment sections are configured such that for each portion of a plurality of portions of the plurality of fluorescent regions an air gap extends in a vertical cross-section entirely around the portion.

2. The display screen of claim 1, wherein the plurality of fluorescent regions comprise a plurality of elongated regions, and the vertical cross-section is perpendicular to a longitudinal axis of the elongated region.

3. The display screen of claim 2, wherein the plurality of fluorescent regions comprise a plurality of parallel stripes, and the vertical cross-section is perpendicular to a longitudinal axis of the parallel stripes.

4. The display screen of claim 2, wherein, for a particular elongated region, patches are positioned at different positions along the longitudinal axis.

5. The display screen of claim 4, wherein adjacent patches along the longitudinal axis of the elongated region support different areas along an axis perpendicular to the longitudinal axis.

6. The display screen of claim 4, wherein the plurality of first attachment sections comprise a plurality of patches with at least some patches supporting a plurality of fluorescent regions.

7. The display screen of claim 4, wherein the plurality of first attachment sections comprise a plurality of patches with at least some patches supporting a single fluorescent region.

8. The display screen of claim 1, wherein the plurality of first attachment sections comprise a plurality of patches with at least some patches supporting multiple fluorescent regions.

9. The display screen of claim 8, wherein the plurality of first attachment sections support edge portions of the fluorescent regions such that excitation-side air gaps span center sections of the fluorescent regions.

10. The display screen of claim 1, wherein the plurality of first attachment sections support edge portions of the fluorescent regions such that excitation-side air gaps span center sections of the fluorescent regions.

11. The display screen of claim 1, wherein the first attachment sections are randomly distributed.

12. The display screen of claim 1, wherein the plurality of first attachment sections are formed from a UV-curable resin.

13. The display screen of claim 1, wherein the air gaps are filled with a substantially pure gas.

14. The display screen of claim 1, wherein there is a vacuum in the air gaps.

15. The display screen of claim 1, wherein the excitation-side air gaps extend to the excitation side surface of the plurality of fluorescent regions, and the viewer-side air gaps extend to the viewer side surface of the plurality of fluorescent regions.

16. A display screen comprising:
a filter layer;
a fluorescent layer including a plurality of fluorescent regions laterally separated by lateral-side air gaps; and
a first attachment layer that attaches an excitation side surface of the plurality of fluorescent regions to the filter layer;
a sheet layer positioned on a side of the fluorescent layer farther from the filter layer; and
a second attachment layer positioned between the fluorescent layer and the sheet layer, wherein the second attachment layer includes a plurality of attachment sections that are laterally separated by viewer-side air gaps and that attach a viewer side surface of plurality of fluorescent layer to the sheet layer while providing vertical separation between the fluorescent layer and the sheet layer, wherein the plurality of attachment sections are arranged in an anti-aliasing pattern configured to reduce moiré patterns in an image displayed on the display screen.

17. The display screen of claim 16, wherein the anti-aliasing pattern includes a cross-hatch pattern.

18. The display screen of claim 16, wherein the anti-aliasing pattern includes a sinusoidal pattern.

19. The display screen of claim 16, wherein the plurality of attachment sections are composed of an adhesive.

20. The display screen of claim 16, wherein the first attachment layer includes a plurality of first attachment sections that are laterally separated by excitation-side air gaps and that attach an excitation side surface of the plurality of fluorescent regions to the filter layer while providing vertical separation between the plurality of fluorescent regions and the filter layer.

* * * * *